(12) United States Patent
Jeon et al.

(10) Patent No.: US 11,177,556 B2
(45) Date of Patent: Nov. 16, 2021

(54) ANTENNA AND ELECTRONIC DEVICE COMPRISING SAME

(71) Applicant: Samsung Electronics Co., Ltd., Gyeonggi-do (KR)

(72) Inventors: Seunggil Jeon, Gyeonggi-do (KR); Jeongheum Lee, Gyeonggi-do (KR); Jaebong Chun, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 21 days.

(21) Appl. No.: 16/650,114

(22) PCT Filed: Nov. 27, 2018

(86) PCT No.: PCT/KR2018/014670
§ 371 (c)(1),
(2) Date: Mar. 24, 2020

(87) PCT Pub. No.: WO2019/107862
PCT Pub. Date: Jun. 6, 2019

(65) Prior Publication Data
US 2020/0303808 A1    Sep. 24, 2020

(30) Foreign Application Priority Data

Nov. 28, 2017  (KR) ........................ 10-2017-0160540

(51) Int. Cl.
*H01Q 1/24* (2006.01)
*H01Q 9/16* (2006.01)
(Continued)

(52) U.S. Cl.
CPC ................. *H01Q 1/24* (2013.01); *H01Q 9/16* (2013.01); *H01Q 9/30* (2013.01); *H01Q 21/065* (2013.01)

(58) Field of Classification Search
CPC .......... H01Q 1/24; H01Q 1/241; H01Q 1/243; H01Q 9/16; H01Q 9/285; H01Q 21/06; H01Q 21/061; H01Q 21/065; H01Q 21/08

See application file for complete search history.

(56) References Cited

U.S. PATENT DOCUMENTS 8,270,255 B2    9/2012  Cuschieri et al.
9,419,326 B2 *  8/2016  Han ................... B29C 45/1671
(Continued)

FOREIGN PATENT DOCUMENTS

JP    2017-17542 A    1/2017
KR    10-0748575 B1   8/2007
(Continued)

*Primary Examiner* — Jason Crawford
(74) *Attorney, Agent, or Firm* — Cha & Reiter, LLC

(57) ABSTRACT

Disclosed is an electronic device including a housing including a front surface, a rear surface, and a side member, a rigid printed circuit board including a first ground, a flexible printed circuit board including a second ground and extended toward the side surface from one end of the rigid printed circuit board, a plurality of antenna elements mounted on the flexible printed circuit board and radiating a millimeter wave signal, a support member fixing the flexible printed circuit board to be at a predetermined angle with the rear surface, and a communication circuit, the first ground and the second ground allows a radiation pattern of the millimeter wave signal to have directivity in a direction of the side surface, by shielding a component, which is radiated toward at least part of the front surface or the rear surface, of a millimeter wave signal radiated from the plurality of radiators.

15 Claims, 15 Drawing Sheets

(51) Int. Cl.
*H01Q 21/06* (2006.01)
*H01Q 9/30* (2006.01)

(56) References Cited

U.S. PATENT DOCUMENTS

| | | | |
|---|---|---|---|
| 9,653,818 B2 | 5/2017 | Mohammadian et al. | |
| 2006/0170597 A1* | 8/2006 | Kurashima | H01Q 1/44 343/700 MS |
| 2008/0122705 A1 | 5/2008 | Kurashima et al. | |
| 2010/0271265 A1* | 10/2010 | Sung | B29C 45/14639 343/700 MS |
| 2015/0138024 A1* | 5/2015 | Kalistaja | H01Q 5/385 343/702 |
| 2018/0026341 A1* | 1/2018 | Mow | H04B 10/90 343/702 |
| 2020/0021015 A1* | 1/2020 | Yun | H01Q 21/24 |
| 2020/0365972 A1* | 11/2020 | Jeon | H01Q 9/0407 |

FOREIGN PATENT DOCUMENTS

| | | |
|---|---|---|
| KR | 10-2010-0108785 A | 10/2010 |
| KR | 10-1301064 B1 | 8/2013 |
| KR | 10-2017-0101310 A | 9/2017 |

* cited by examiner

ANTENNA AND ELECTRONIC DEVICE COMPRISING SAME

CLAIM OF PRIORITY

This application is a National Phase Entry of PCT International Application No. PCT/KR2018/014670, which was filed on Nov. 27, 2018, and claims a priority to Korean Patent Application No. 10-2017-0160540, which was filed on Nov. 28, 2017, the contents of which are incorporated herein by reference.

TECHNICAL FIELD

Embodiments disclosed in this specification refer to an antenna and an electronic device including an antenna.

BACKGROUND ART

As an information technology (IT) develops, various types of electronic devices are widely being supplied. An electronic device may communicate with any other electronic device or a base station, using an antenna.

Nowadays, as the network traffic of a mobile device significantly increases, next-generation mobile communication technology using a signal in an ultra-high-frequency band, for example, 5th generation (5G) technology is being developed. When the signal in the ultra-high-frequency band is used, a wavelength length of the signal may become short to a millimeter unit. Also, because the bandwidth may be used more widely, a significant amount of information may be transmitted or received. Because an antenna array has an effective isotropically radiated power (EIRP) greater than a single antenna, the antenna array may transmit/receive various kinds of data more effectively. The signal in the ultra-high-frequency band may be referred to as a "so-called millimeter wave signal".

DISCLOSURE

Technical Problem

When an electromagnetic wave passes through a dielectric substance having permittivity of a specified magnitude, a wavelength length of the electromagnetic wave may be changed. In this case, when the dielectric substance is present in only the partial region, travel speeds of an electromagnetic wave passing through the dielectric substance and an electromagnetic wave not passing through the dielectric substance may be different from each other, thereby causing distortion of a radiation pattern of a radiated electromagnetic wave. When the dielectric substance forms a specified angle with respect to a propagation direction of an electromagnetic wave, influences of a horizontal component and a vertical component of the electromagnetic wave due to the dielectric substance may be different from each other, thereby causing more serious distortion of the radiation pattern.

The housing of an electronic device may include a dielectric substance having permittivity of a specified magnitude. In this case, a radiation pattern which is formed by an electromagnetic wave radiated from an antenna positioned within the housing may be distorted while the electromagnetic wave passes through the housing.

In the mobile communication technology before 5G, a frequency of the electromagnetic wave may be relatively low, and a wavelength length may be relatively long. For example, in the case of a WiBro signal, a frequency may be approximately 2.4 GHz, and a wavelength length is approximately 125 mm. Because the thickness of a housing, for example, a dielectric substance is very short compared with the wavelength length, the distortion of a radiation pattern due to the housing may be ignorable with regard to the communication performance of an electronic device.

In the 5G mobile communication technology, an electromagnetic wave (e.g., a millimeter wave signal) including a frequency of an ultra-high-frequency band, for example, 28 GHz may be used for wireless communication. A wavelength length of the electromagnetic wave including the frequency of 28 GHz is approximately 10.7 mm. Because the electromagnetic wave of the ultra-high-frequency band is very short, a relative thickness of the housing of the electronic device may become large. For example, as the 5G mobile communication technology approaches, the distortion of the radiation pattern due to the housing may have a meaningful influence on the communication performance of the electronic device.

When a component of an electromagnetic wave arrives at a dielectric substance, a relative thickness of which is larger than a specified thickness, the dielectric substance may operate as a second antenna. For example, when an electromagnetic wave arrives at the dielectric substance after being radiated from an antenna (e.g., first radiation), second radiation coming from the electromagnetic wave may be made from the dielectric substance. In this case, the first radiation and the second radiation may have a radiation characteristic which is similar to a radiation characteristic of a radiation pattern formed by antenna elements constituting an antenna array. For example, the directivity may be given in a specific direction, and a null region may appear.

In the case of the antenna array arranged with a specific rule, a design may be possible to have the directivity in a target direction. However, as described above, when the antenna array is formed by a dielectric substance which is impossible to specify a length, a distance, or a thickness, a radiation pattern may be distorted, and the directivity may not be given in a target direction.

According to embodiments of the disclosure, an electronic device may reduce influence of a dielectric substance in a millimeter wave signal by blocking a component(s), which is radiated in a direction for reducing radiation performance of an antenna, from among components of the millimeter wave signal radiated from the antenna.

Technical Solution

According to an embodiment disclosed in this specification, an electronic device may include a housing including a front surface, a rear surface facing away from the front surface, and a side member surrounding a space between the front surface and the rear surface, a rigid printed circuit board disposed inside the housing and including a first ground, a flexible printed circuit board including a second ground and extended toward the side surface from one end of the rigid printed circuit board, a plurality of antenna elements mounted on the flexible printed circuit board and radiating a millimeter wave signal, a support member fixing the flexible printed circuit board to be at a predetermined angle with the rear surface, and a communication circuit electrically connected to the plurality of antenna elements and communicating using the millimeter wave signal. The first ground and the second ground may allow a radiation pattern of the millimeter wave signal to have directivity in a direction of the side surface, by shielding a component, which is radiated toward at least part of the front surface or the rear surface, of a millimeter wave signal radiated from the plurality of radiators. The front surface may be formed of a dielectric substance having first permittivity and the rear surface is formed of a dielectric substance having second permittivity.

Advantageous Effects

According to embodiments of the disclosure, an electronic device may reduce influence of a housing formed of a dielectric substance upon radiating a millimeter wave signal. For example, the electronic device may allow a radiation pattern of the millimeter wave signal to have directivity in a target direction and may reduce distortion of the radiation pattern due to the housing, thereby improving the communication performance of electronic device. Besides, a variety of effects directly or indirectly understood through the disclosure may be provided.

DESCRIPTION OF DRAWINGS

With regard to description of drawings, the same or similar components may be marked by the same or similar reference numerals.

MODE FOR INVENTION

Figure 1:
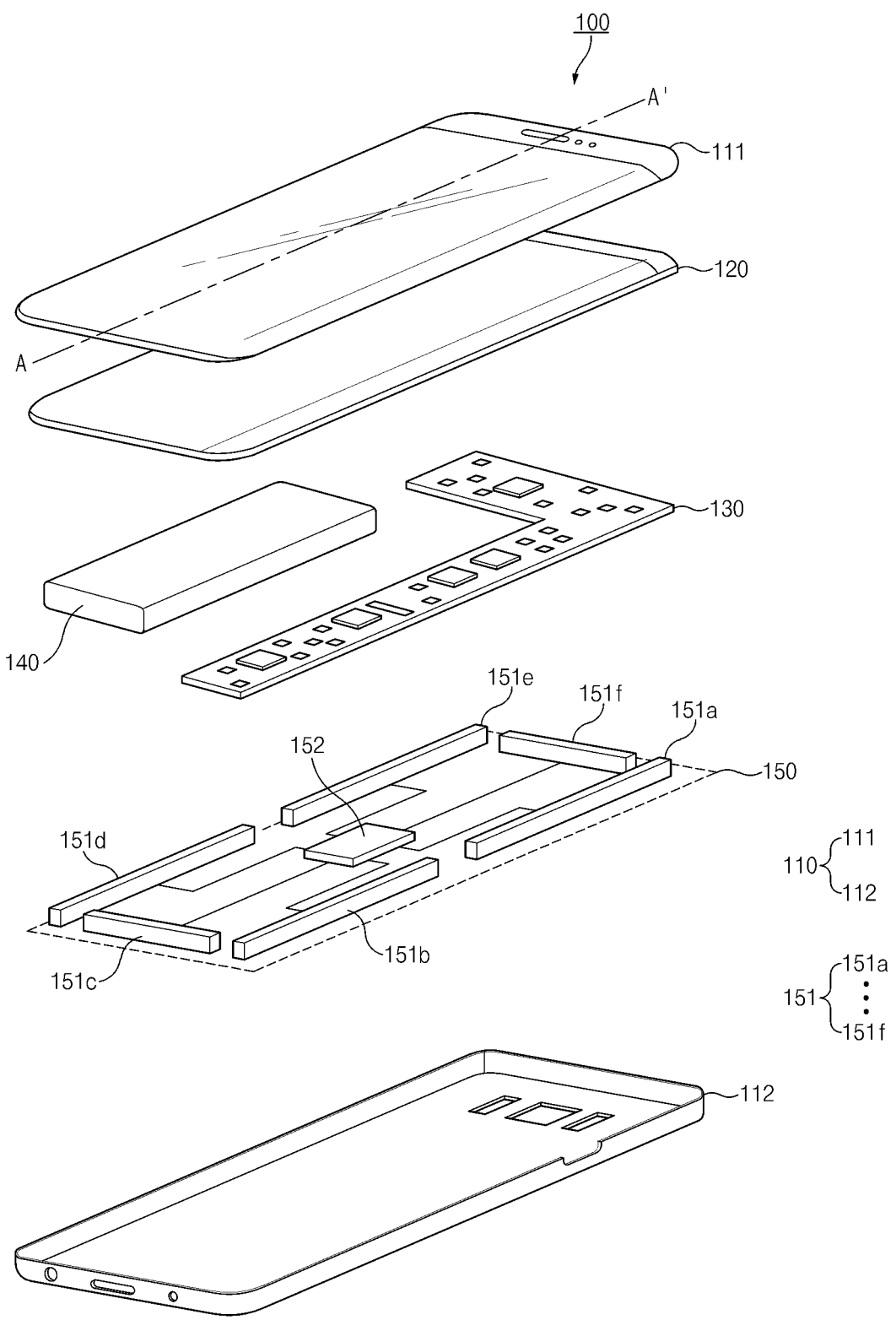
FIG. 1 is an exploded perspective view of an electronic device, according to an embodiment.

FIG. 1 is an exploded perspective view of an electronic device according to an embodiment.

Referring to FIG. 1, an electronic device 100 may include a cover glass 111, a rear cover 112, a display 120, a printed circuit board 130, a battery 140, or a communication system 150.

According to an embodiment, the cover glass 111 and the rear cover 112 may be coupled with each other to form housing 110. The housing 110 may form the exterior of the electronic device 100, and may protect internal components of the electronic device 100 from external impact.

According to an embodiment, the housing 110 may include a front surface, a rear surface facing away from the front surface, and a side surface surrounding a space between the front surface and the rear surface. In an embodiment, the side surface may include a first side surface and a second side surface. It may be understood that the first side surface is a region which is bent and extended toward the rear surface from the front surface. It may be understood that the second side surface is a region which is bent and extended toward the front surface from the rear surface.

According to various embodiments, a shape of the housing 110 may be at least one of a rectangle, substantially a rectangle, a circle, and an ellipse, when viewed from the front surface. For example, the housing 110 may be in the form of a rectangle or substantially a rectangle including a first edge, a second edge facing away from the first edge, a third edge connecting one end of the first edge and one end of the second edge, and a fourth edge connecting an opposite end of the first edge and an opposite end of the second edge, when viewed from the front surface.

According to various embodiments, the shape of the side surface may be various. For example, the cross section of the side surface may be in the form of a semicircle. For another example, the cross section of the side surface may be in the form of a triangle. For another example, the cross section of the side surface may be in the form of a rectangle.

According to an embodiment, the front surface and the first side surface extended from the front surface may be formed of the cover glass 111, and the rear surface and the second side surface extended from the rear surface may be formed of the rear cover 112. For another embodiment, the front surface may be formed of the cover glass 111, and the rear surface, the first side surface, and the second side surface may be formed of the rear cover 112.

According to an embodiment, at least part of the first side surface and the second side surface may be formed of a conductor. For example, the conductor may include a metal material such as aluminum (Al), stainless steel, or the like. In this case, at least part of the first side surface and the second side surface may be formed of a metal frame which is distinguished from the front surface or the rear surface of the housing 110, for example. For example, the housing 110 may include the cover glass 111 corresponding to the front surface, the rear cover 112 corresponding to the rear surface, and the metal frame corresponding to the side surface.

According to an embodiment, at least part of the cover glass 111 and the rear cover 112 may be formed of a dielectric substance having the permittivity of a specified magnitude. For example, the cover glass 111 may be formed of a dielectric substance having first permittivity, and the rear cover 112 may be formed of a second dielectric substance having second permittivity. In an embodiment, the first permittivity and the second permittivity may be identical.

According to an embodiment, the display 120 may be interposed between the cover glass 111 and the rear cover 112. The display 120 may be electrically connected to the printed circuit board 130, and may output content (e.g., a text, an image, a video, an icon, a widget, a symbol, or the like) or may receive a touch input (e.g., a touch, a gesture, a hovering, or the like) from the user.

According to an embodiment, various electronic parts, various components, various printed circuits, or the like of the electronic device 100 may be mounted on the printed circuit board 130. For example, an application processor (AP), a communication processor (CP), a memory, or the like may be mounted on the printed circuit board 130. In this specification, the printed circuit board 130 may be referred to as a first printed circuit board (PCB), a main PCB, a main board, or a printed board assembly (PBA).

According to an embodiment, the battery 140 may convert chemical energy and electrical energy bidirectionally. For example, the battery 140 may convert chemical energy into electrical energy and may supply the converted electrical energy to the display 120 and various components or modules mounted on the printed circuit board 130. For another example, the battery 140 may convert and store electrical energy supplied from the outside into chemical energy. According to an embodiment, a power management module for managing the charging and discharging of the battery 140 may be included in the printed circuit board 130.

According to an embodiment, the communication system 150 may be interposed between the printed circuit board 130 and the rear cover 112. According to an embodiment, an adhesive material may be interposed between the communication system 150 and the rear cover 112, and the communication system 150 may be attached to the rear cover 112. In this specification, the communication system 150 may be referred to as a "5G module PCB".

According to an embodiment, the communication system 150 may include a communication device 151 and a communication module 152. According to various embodiments, the communication system 150 is not limited to illustration of FIG. 1. For example, unlike the illustration of FIG. 1, the communication system 150 may include a plurality of communication devices 151. The communication device 151 may be positioned in various forms, unlike the illustration of FIG. 1.

According to an embodiment, the communication module 152 may be electrically connected with the communication device 151 and may feed the communication device 151. In this specification, "feed" (or "feeding") may mean an operation in which the communication module 152 applies a current to the communication device 151.

In an embodiment, the wireless communication module 152 may communicate with an external electronic device or a base station through a millimeter wave signal by feeding the communication device 151. The millimeter wave signal may be understood, for example, as a signal, a wavelength of which is a millimeter unit, or a signal having a frequency of a band ranging from 20 GHz to 100 GHz.

According to an embodiment, the electronic device 100 may include a plurality of communication devices 151a, 151b, 151c, 151d, 151e, and 151f. According to an embodiment, the communication device 151 may be positioned adjacent to a periphery of the electronic device 100, for example, a side surface of the housing 110.

For example, when the housing 110 is in the form of a rectangle or substantially a rectangle including a first edge, a second edge, a third edge, and a fourth edge, the electronic device 100 may include the first communication device 151a positioned adjacent to the first edge, the second communication device 151c positioned adjacent to the second edge, the third communication device 151d positioned adjacent to the third edge, and the fourth communication device 151f positioned adjacent to the fourth edge.

For another example, as illustrated in FIG. 1, the electronic device 100 may further include the fifth communication device 151b positioned adjacent to the first edge and the sixth communication device 151e positioned adjacent to the second edge.

For another example, when the housing 110 is in the form of a circle, the electronic device 100 may include the plurality of communication devices 151 which are positioned to be spaced from the center of the circle by a specified distance toward the side surface.

In an embodiment, the communication device 151 may radiate a millimeter wave signal toward the outside of the electronic device 100. The electronic device 100 may communicate with a base station or an external electronic device through the radiated millimeter wave signal.

According to an embodiment, the communication device 151 may include an antenna array including a plurality of antenna elements. According to an embodiment, the antenna elements included in the antenna array may form an omni-directional radiation pattern in a free space. The free space may be understood, for example, as a space which consists of only a dielectric substance having permittivity of "1".

According to an embodiment, when the antenna array including the antenna elements is positioned within the housing 110 of the electronic device 100, not in the free space, the antenna array may form a radiation pattern different from the omni-directional radiation pattern due to various components positioned within the electronic device 100. For example, the antenna array may form a radiation pattern having directivity toward the side surface of the housing 110 at the inside of the electronic device 100. When the antenna array forms a radiation pattern having directivity in a specific direction, the communication performance of the electronic device 100 in the specific direction may be improved.

According to an embodiment, the antenna array included in the communication device 151 may include a dipole antenna array. According to an embodiment, the electronic device 100 may further include a patch antenna array electrically connected with the communication module 152. For example, the communication device 151 may further include the patch antenna array.

In an embodiment, the patch antenna array may radiate a millimeter wave signal in a direction different from (e.g., perpendicular to) a direction in which the dipole antenna array radiates a signal. For example, the dipole antenna array may radiate a millimeter wave signal toward the side surface of the housing 110, and the patch antenna array may radiate a millimeter wave signal toward the front surface or the rear surface of the housing 110.

According to an embodiment, the dipole antenna array may radiate a signal including a first frequency band, and the patch antenna array a signal including a second frequency band. According to an embodiment, the first frequency band and the second frequency band may be identical.

In the disclosure, the description given with reference to FIG. 1 may be identically applied to components having the same reference numerals/marks as the components of the electronic device 100 described with reference to FIG. 1.

Figure 2A:
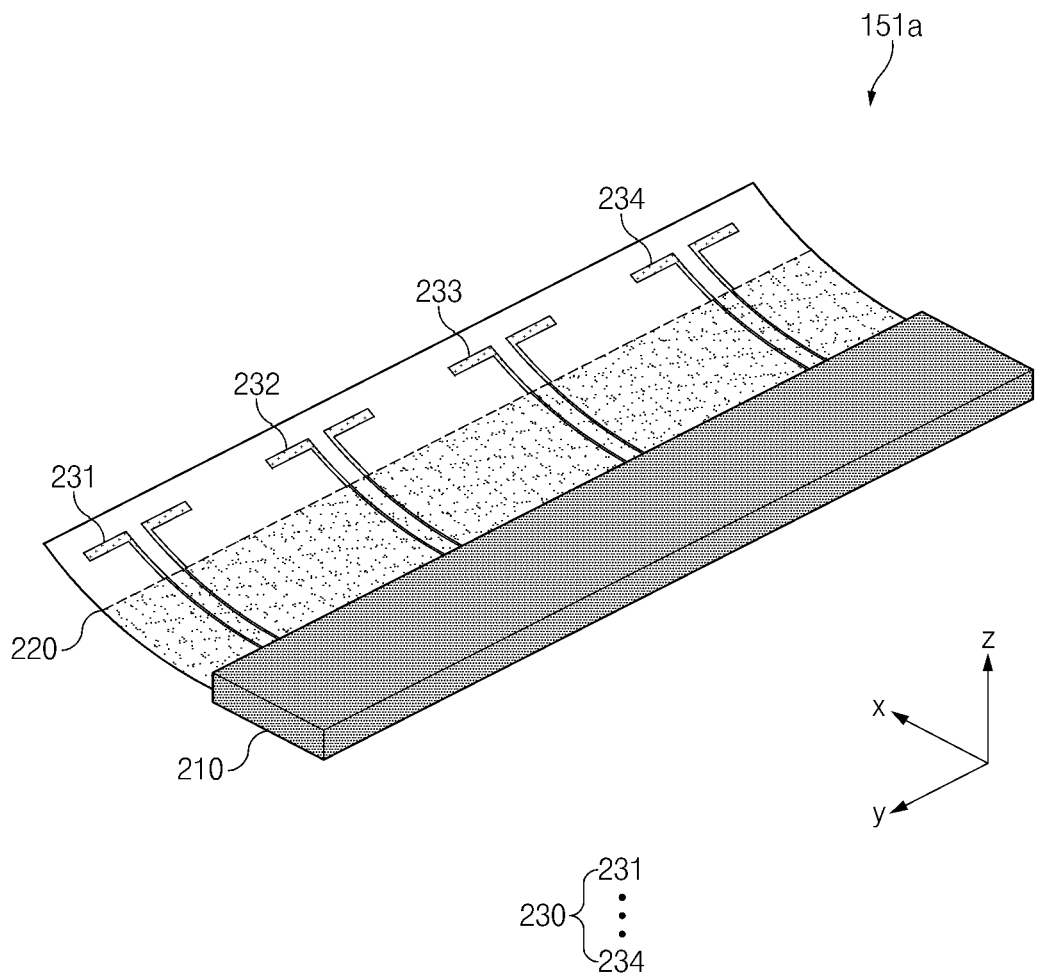
FIG. 2A is a perspective view of a communication device included in an electronic device, according to an embodiment.
Figure 2B:
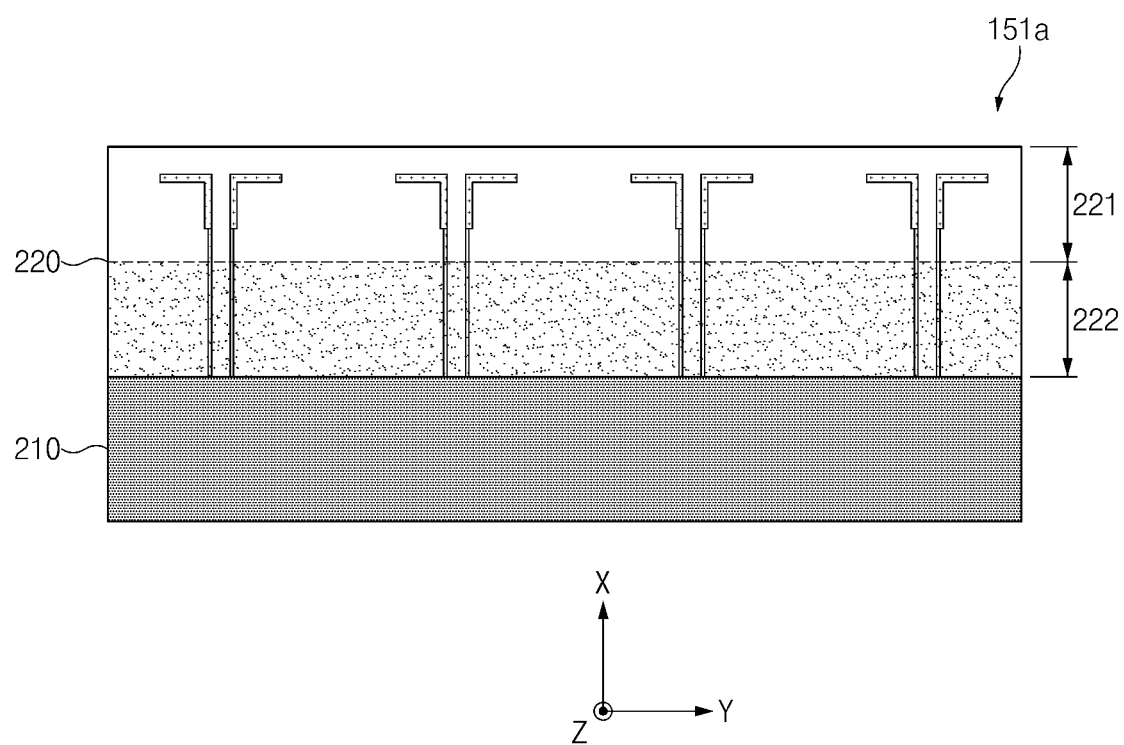
FIG. 2B is a plan view of a communication device included in an electronic device, according to an embodiment.
Figure 2C:
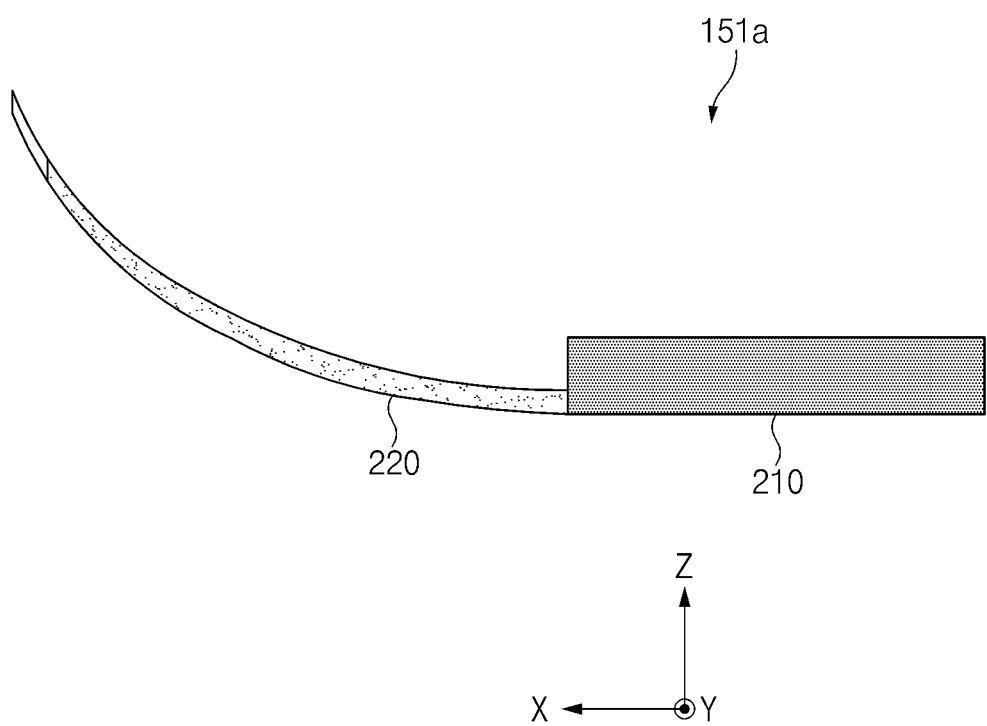
FIG. 2C is a lateral view of a communication device included in an electronic device, according to an embodiment.

FIG. 2A is a perspective view of a communication device included in an electronic device according to an embodiment. FIG. 2B is a plan view of a communication device included in an electronic device according to an embodiment. FIG. 2C is a lateral view of a communication device included in an electronic device according to an embodiment. For example, the Z-axis direction in FIGS. 2A to 2C may indicate the direction of the front surface of the housing 110.

Referring to FIGS. 2A to 2C, the communication device 151a may include a plurality of antenna elements 231, 232, 233, 234, a printed circuit board (PCB) 210, and a flexible printed circuit (FPC) 220. The plurality of antenna elements 231, 232, 233, and 234 may form the antenna array 230.

According to an embodiment, the antenna elements 231, 232, 233, and 234 may be fed from the communication module 152 and may form a beam for radiating a millimeter wave signal. According to an embodiment, the antenna elements 231, 232, 233, and 234 may form a dipole antenna. For example, the antenna elements 231, 232, 233, and 234 may form a beam so as to have an omni-directional radiation pattern in a horizontal direction parallel to the antenna elements 231, 232, 233, and 234, in a free space (e.g., a space in which permittivity is "1"). According to another embodiment, unlike illustration of FIGS. 2A to 2C, the antenna elements 231, 232, 233, and 234 may form a monopole antenna. In this specification, the antenna element 220 may be referred to as an "antenna element".

According to an embodiment, the plurality of antenna elements 231, 232, 233, and 234 may be mounted on the FPC 220. According to an embodiment, the plurality of antenna elements 231, 232, 233, and 234 may be positioned on the FPC 220 at specified intervals. According to an embodiment, wires for feeding a plurality of antenna elements 231, 232, 233, and 234 may be positioned on the FPC 220 and may be connected to one end of the PCB 210.

According to an embodiment, the PCB 210 may be a PCB of a non-bending material. In this specification, the PCB 210 may be referred to as a "5G module PCB", a "second PCB", or the like.

According to an embodiment, a plurality of electrical elements may be disposed on the PCB 210. For example, wires for feeding the plurality of antenna elements 231, 232, 233, and 234 may be positioned on the PCB 210. Through the wires, the plurality of antenna elements 231, 232, 233, and 234 may be electrically connected with the communication module 152 and may be fed.

According to an embodiment, the PCB 210 may include ground for the plurality of electrical elements. In this specification, the ground may be referred to as "PCB ground". The PCB ground may reduce at least part of a millimeter wave signal radiated from the antenna elements 231, 232, 233, and 234, for example, a component radiated toward the PCB 210. In this case, the millimeter wave signal may not arrive at a dielectric substance present in a direction of the PCB 210, for example, at a partial region of the front surface of the housing 110 or a partial region of the rear surface of the housing 110.

According to an embodiment, the FPC 220 may be extended at one end of the PCB 210. The FPC 220 may be a PCB capable of being easily bent. Because the FPC 220 is capable of being bent, the FPC 220 may be easily disposed even though the mounting space inside the electronic device 100 is narrow.

According to an embodiment, the FPC 220 may include a first region 221 and a second region 222. The first region 221 may be a region in which the plurality of antenna elements 231, 232, 233, and 234 are mounted. In an embodiment, in the first region 221, the millimeter wave signal may be radiated from the plurality of antenna elements 231, 232, 233, and 234. The second region 222 may be a region including the ground. In this specification, the ground may be referred to as an "FPC ground". In this specification, the wire for feeding a plurality of antenna elements may be positioned in the second region 222.

According to an embodiment, the FPC ground may reduce at least part of a millimeter wave signal radiated from the antenna elements 231, 232, 233, and 234, for example, a component radiated in the direction (e.g., −X axis direction) of the FPC 220. In this case, the millimeter wave signal may not arrive at a dielectric substance present in a direction of the FPC 220, for example, at a partial region of the front surface of the housing 110 or a partial region of the rear surface of the housing 110.

According to an embodiment, because the FPC 220 is capable of being bent, the region where the millimeter wave signal is not reached may be expanded. For example, as illustrated in FIG. 2C, the FPC 220 may be bent toward the cover glass 111 of the housing 110. In this case, the region where the millimeter wave signal is not reached may be expanded on the rear cover 112 of the housing 110. For another example, unlike the illustration in FIG. 2C, the FPC 220 may be bent toward the rear cover 112 of the housing 110. In this case, the region where the millimeter wave signal is not reached may be expanded on the cover glass 111 of the housing 110.

In FIGS. 2A to 2C, a shape of the communication device 151a, a configuration of the communication device 151a, the number of the antenna elements 231, 232, 233, and 234, the locations of the antenna elements 231, 232, 233, and 234, or the like are exemplary, and the embodiments of the disclosure are not limited to illustration of FIGS. 2A to 2C. Also, in this specification, the description given with reference to the communication device 151a illustrated in FIGS. 2A to 2C may be identically or similarly applied to the second to sixth communication devices 151b to 151f.

Also, in this specification, the description given with reference to FIGS. 2A to 2C may be identically applied to components having the same reference numerals/marks as the components of the communication device 151a described with reference to FIGS. 2A to 2C.

Figure 3:
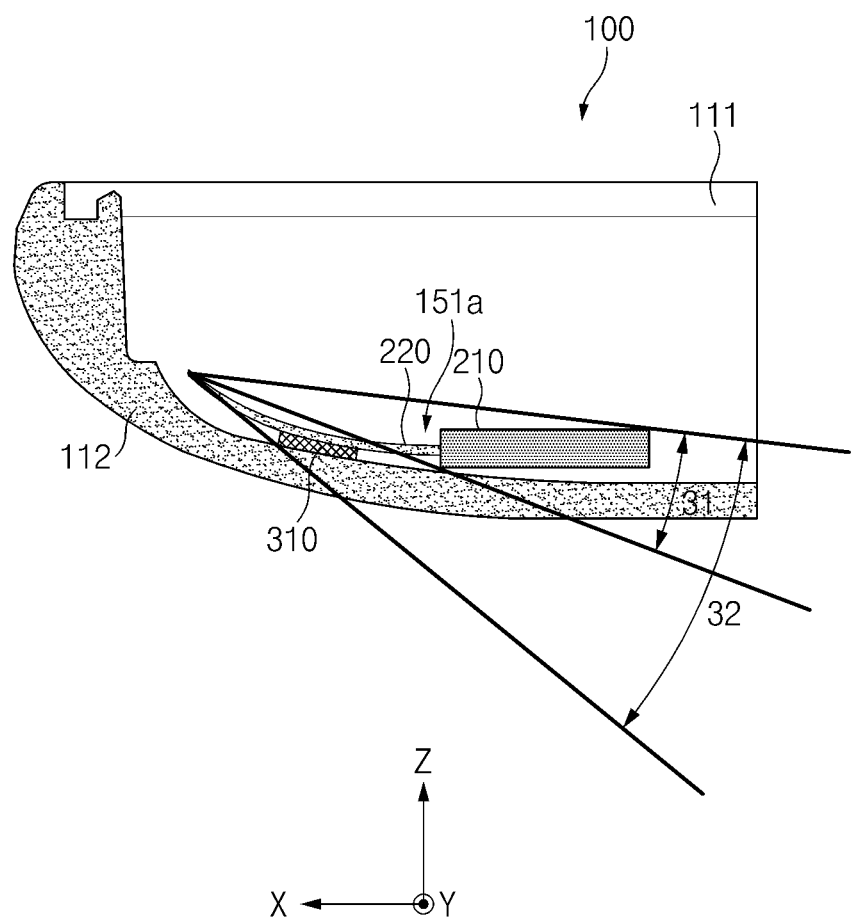
FIG. 3 illustrates a wave blocking region of an electronic device, according to an embodiment.

FIG. 3 illustrates a wave blocking region of an electronic device, according to an embodiment. FIG. 3 illustrates a part of a cross section taken along a line A-A', for example, in a state where an electronic device illustrated in FIG. 1 is assembled.

Referring to FIG. 3, the electronic device 100 may include the cover glass 111, the rear cover 112, the communication device 151a, and a support member 310. According to various embodiments, the electronic device 100 may further include a component not illustrated in FIG. 3A. For example, the electronic device 100 may further include the communication module 152 electrically connected with the communication device 151a. In an embodiment, a target direction in which the electronic device 100 intends to communicate through a millimeter wave signal may be an X-axis direction.

According to an embodiment, the communication device 151a may be positioned toward the target direction. For example, the antenna element (e.g., the antenna array 230 of FIG. 2A) included in the communication device 151a may be mounted to be extend in the X-axis direction from the PCB 210. In an embodiment, the FPC 220 on which the antenna element is mounted may be bent towards the cover glass 111 of the housing 110.

According to an embodiment, the FPC 220 may be bent at the angle specified by the support member 310. The support member 310 may be fixed such that the FPC 220 is bent at a specified angle to face the specified direction. According to various embodiments, the support member 310 may be formed by a cushion, a rib, a bracket, a part of the housing 110, or the like.

According to an embodiment, the ground included in the PCB 210, for example, the PCB ground may reduce at least part of a millimeter wave signal radiated from the antenna elements 231, 232, 233, and 234, for example, a component radiated toward the PCB 210. For example, the first region 31 may indicate a blocking region in which a millimeter wave signal is blocked by the PCB ground. A component of the millimeter wave signal in the direction of the rear cover 112 of the housing 110 corresponding to the first region 31 may be blocked.

According to an embodiment, the ground included in the FPC 220, for example, the FPC ground may reduce at least part of a millimeter wave signal radiated from the antenna elements 231, 232, 233, and 234, for example, a component radiated toward the FPC 220. For example, the second region 32 may indicate a blocking region in which a millimeter wave signal is blocked by the FPC ground. A component of the millimeter wave signal in the direction of the rear cover 112 of the housing 110 corresponding to the second region 32 may be blocked.

According to an embodiment, the second region 32 may be wider than the first region 31. For example, because the FPC 220 is exposed in the X-axis direction from the PCB 210 and bent in the Z-axis direction, the second region 32, which is the blocking region where the millimeter wave signal is blocked by the FPC ground, may be wider than the first region 31. In an embodiment, the wave blocking region of the millimeter wave signal may be expanded from first region 31 to second region 32 by the FPC 220.

According to an embodiment, a component, which is radiated in a direction other than the target direction, in a millimeter wave signal radiated from the antenna elements 231, 232, 233, and 234 may be blocked to a specified level or lower by the ground included in the PCB 210 and the FPC 220. As such, the electronic device 100 may allow the millimeter wave signal to form a radiation pattern having directivity in the target direction.

According to an embodiment, when the intensity of the millimeter wave signal reaches intensity greater than a level specified to a dielectric substance having a thickness of a specified level or greater compared to a wavelength, second radiation may be made from the dielectric substance. The second radiation may be based on first radiation of the millimeter wave signal made by the communication device 151a.

According to an embodiment, when the intensity of the millimeter wave signal which arrives at the front surface (e.g., the cover glass 111) or the rear surface (e.g., the rear cover 112) of the housing 110 becomes smaller than the specified level due to the PCB 210 or the FPC 220, the intensity of the second radiation which may come from a dielectric substance (e.g., the cover glass 111 or the rear cover 112) may become smaller than the specified level, or the second radiation may not be made. In this case, influence of the second radiation on the first radiation of the millimeter wave signal made at the communication device 151a may be smaller than the specified level. For example, a radiation pattern of the millimeter wave signal radiated from the communication device 151a may be protected against distortion due to the dielectric substance.

According to an embodiment, because a component, which is radiated toward the side surface of the housing 110, of the millimeter wave signal is not shielded by the PCB ground or the FPC ground, the component of the millimeter wave signal may be greater than a specified intensity. In an embodiment, because the component radiated toward the side surface may be greater than the specified intensity, the second radiation of the millimeter wave signal may be made on the side of the housing 110. A null region may be present in a portion of a radiation pattern by the second radiation, and a portion of the radiation pattern may be distorted by the null region. However, the portion of the radiation pattern, in which the null region occurs, may not be associated with a target direction in which the electronic device 100 intends to communicate through radiation of the millimeter wave signal. For example, the target direction may be a lateral direction of the electronic device 100, and the null region may occur in a direction facing the front surface or the rear surface of the electronic device 100. In this case, the radiation pattern of the millimeter wave signal may have directivity in the lateral direction of the housing 110 being the target direction, and the distortion may be reduced at the radiation pattern facing the target direction.

According to various embodiments, the area of the second region 32 may be changed depending on the length, the degree of bending, or the location of the FPC ground. For example, as the length of the FPC ground increases and the degree of bending increases, the second region 32 may be wider and the influence of the radiation pattern by the dielectric substance may be relatively reduced. In this case, the directivity of the radiation pattern may be far from the side surface. For example, the radiation pattern may face the front surface of the housing 110.

For another example, the length of the FPC ground may be shortened and the degree of bending of the FPC ground may be reduced. For example, the second region 32 may be relatively narrow and the influence of the radiation pattern by the dielectric substance may relatively increase. In this case, the directivity of the radiation pattern may be close to the direction of the side surface.

In an embodiment, the length, the degree of bending, or the location of the FPC ground may be determined depending on the target direction for the radiation of the electronic device 100 and the degree of distortion of the radiation pattern by the dielectric substance, for example, the housing.

According to various embodiments, the electronic device 100 may further include a wave absorber or a reflective member disposed to be spaced from the PCB 210 by a specified distance. In an embodiment, the wave absorber may absorb a portion of a component, which is radiated toward the front surface or the rear surface, of a millimeter wave signal radiated from the plurality of antenna elements. In an embodiment, the reflection member may reflect a portion of a component, which is radiated toward the front surface or the rear surface, of a millimeter wave signal radiated from the plurality of antenna elements. The wave absorber or the reflection member may further broaden the wave blocking region of the millimeter wave signal.

According to various embodiments, the layout of the communication device 151a is not limited to that illustrated in FIG. 3. For example, the communication device 151a may be disposed in various forms, for example, forms bent in the rear surface direction, depending on the mounting space inside the electronic device 100, and a region where a millimeter wave signal is blocked may be also changed depending on the layout.

Figure 4:
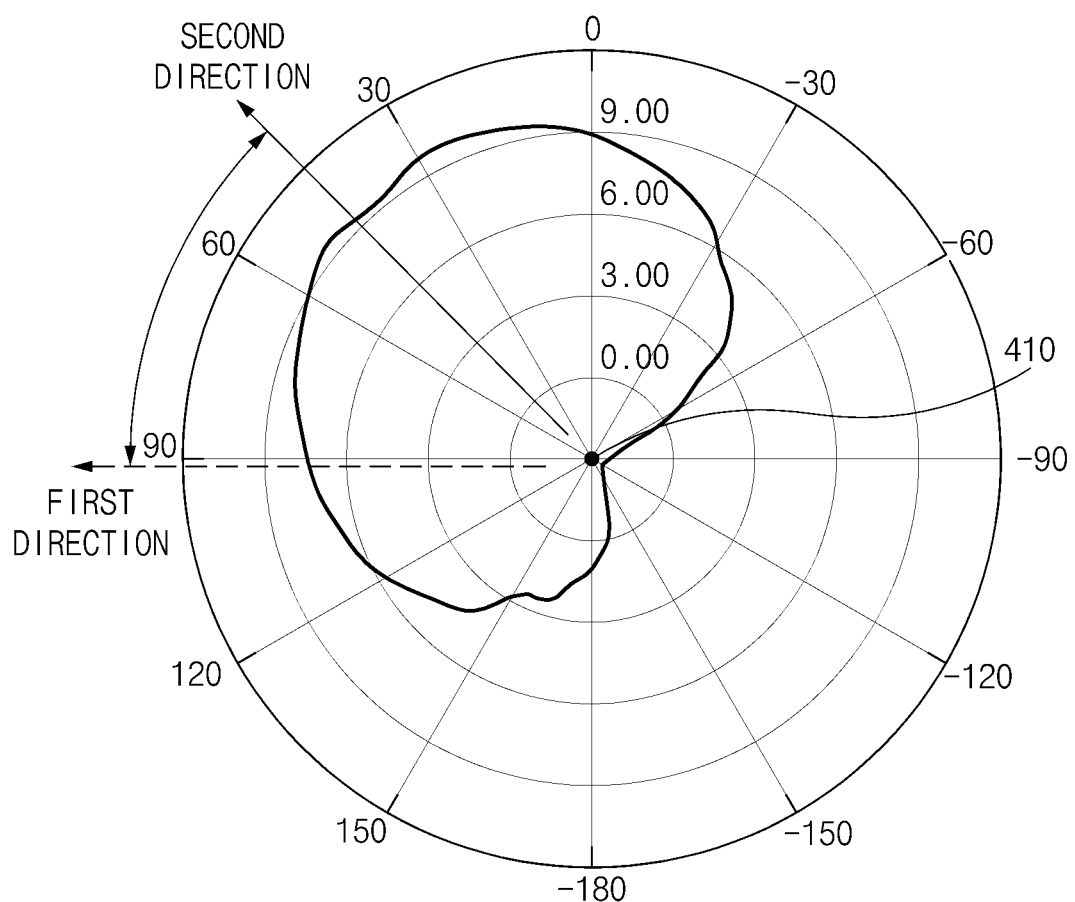
FIG. 4 illustrates a radiation pattern of an electronic device, according to an embodiment.

FIG. 4 illustrates a radiation pattern of an electronic device, according to an embodiment.

Referring to FIG. 4, a radiation pattern of the electronic device 100 may have directivity in a specified direction. For example, the radiation pattern may have directivity in a lateral direction of the housing.

According to an embodiment, the direction of the radiation pattern of the electronic device 100 (e.g., the electronic device 100 of FIG. 3) may be changed due to the influence of an FPC ground. For example, when the FPC (e.g., the FPC 220 of FIG. 2A) is not bent by the support member (e.g., the support member 310 of FIG. 3), the radiation pattern may face in the first direction. When the FPC is bent by the support member in the direction of the front surface of the housing, the radiation pattern may face the second direction. In this case, as the wave blocking region is increased by the FPC ground, the distortion of the radiation pattern may be reduced relatively.

According to an embodiment, as illustrated in FIG. 4, a radiation pattern may have directivity in a direction of approximately 45° and may be formed between approximately −30° and approximately 150°. The size of the radiation pattern may be somewhat small at approximately −30° and approximately 150°, but may maintain 9 dB between 0° and 120°.

According to another embodiment, unlike the illustration of FIG. 4, the radiation pattern may have directivity in a direction of approximately 45°. In this case, the FPC may be bent in the direction of the rear surface of the housing by the support member.

Figure 5A:
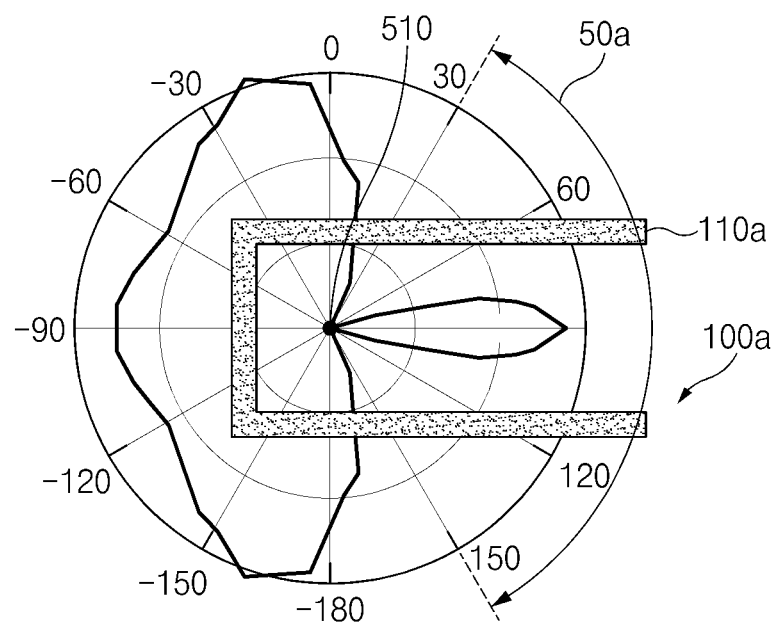
FIG. 5A is a view illustrating a radiation pattern at an electronic device including a housing, a side surface of which has a rectangular cross section, according to an embodiment.
Figure 5B:
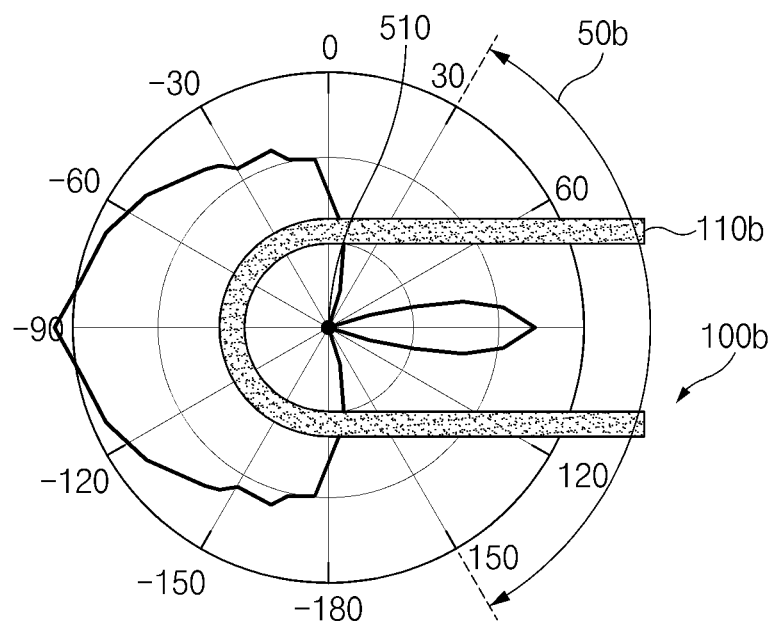
FIG. 5B is a view illustrating a radiation pattern at an electronic device including a housing, a side surface of which has a semicircular cross section, according to an embodiment.
Figure 5C:
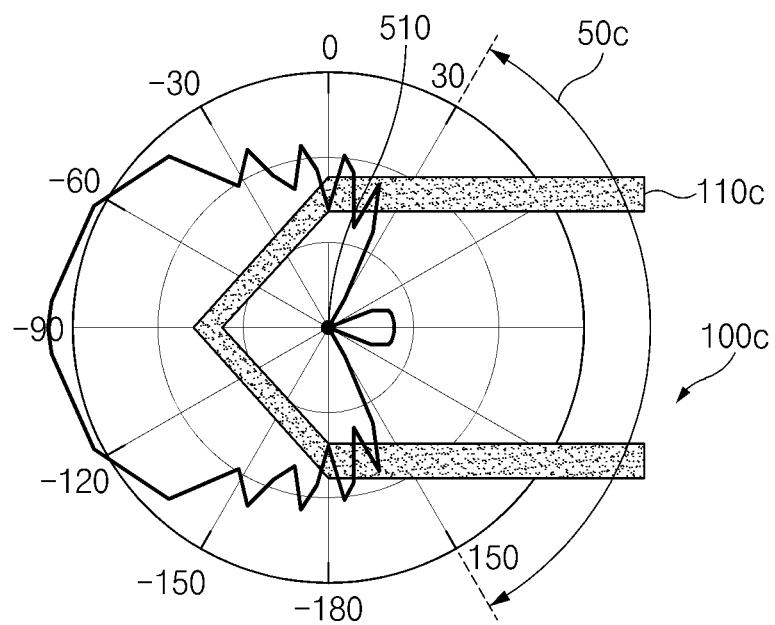
FIG. 5C is a view illustrating a radiation pattern at an electronic device including a housing, a side surface of which has a triangular cross section, according to an embodiment.

FIG. 5A is a view illustrating a radiation pattern at an electronic device including a housing, a side surface of which has a rectangular cross section, according to an embodiment. FIG. 5B is a view illustrating a radiation pattern at an electronic device including a housing, a side surface of which has a semicircular cross section, according to an embodiment. FIG. 5C is a view illustrating a radiation pattern at an electronic device including a housing, a side surface of which has a triangular cross section, according to an embodiment.

Referring to FIG. 5A, an electronic device 100a may include a housing 110a where a cross section of a side surface is rectangular. A millimeter wave signal may be radiated from an antenna element 510 of the electronic device 100a. According to an embodiment, the antenna element 510 may radiate a signal so as to have an omnidirectional radiation pattern in a free space.

According to an embodiment, a radiation pattern of the electronic device 100a may include a first region 50a where a millimeter wave signal is blocked to a specified level or lower. The millimeter wave signal may not arrive at the housing 110a corresponding to the first region 50a. Accordingly, a portion of the housing 110a corresponding to the first region 50a may have no influence on the millimeter wave signal. As a result, it may be observed that a radiation pattern has directivity in a lateral direction and is not almost distorted.

According to an embodiment, the influence of a dielectric substance in a region where a millimeter wave is vertically incident onto the housing 110a may be smaller than in a region where a millimeter wave is obliquely incident. Accordingly, as illustrated in FIG. 5A, a radiation gain toward the vertically incident region may be relatively great.

Referring to FIG. 5B, an electronic device 100b may include a housing 110b where a cross section of a side surface is semicircular.

According to an embodiment, when the side surface is semicircular, a millimeter wave signal radiated from the antenna element 510 may be vertically incident onto a dielectric substance in all directions. Accordingly, in this case, it may be observed that a radiation pattern has a high gain evenly in all directions and is not almost distorted.

Referring to FIG. 5C, an electronic device 100c may include a housing 110c where a cross section of a side surface is triangular.

According to an embodiment, when the side surface is triangular, a millimeter wave signal radiated from the antenna element 510 may be obliquely incident in a partial region. Because a region adjacent to a cover glass and a rear cover is a region in which a millimeter wave signal is obliquely incident, it may be observed that a radiation gain in the region decreases compared to the case of FIG. 5A.

According to an embodiment, with regard to the electronic device 100c, a dielectric substance of a region where the millimeter wave signal is obliquely incident may be relatively close to the antenna element 510, compared to the electronic device 100a illustrated in FIG. 5A. In this case, the dielectric substance may affect a radiation pattern, thereby causing distortion of the radiation pattern. It may be observed from FIG. 5C that a radiation pattern is somewhat distorted.

Figure 6:
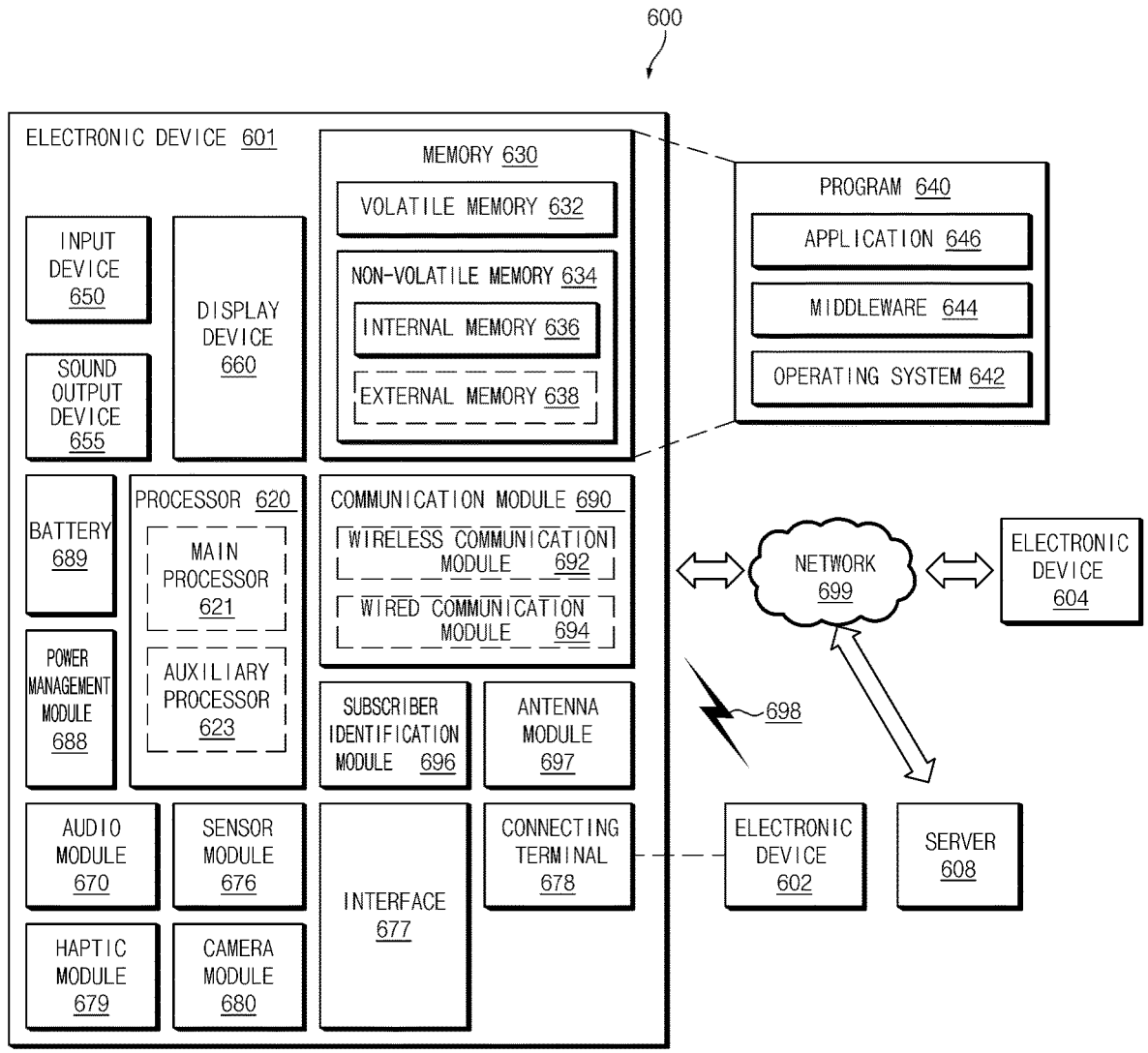
FIG. 6 is a block diagram illustrating an electronic device in a network environment, according to various embodiments.

FIG. 6 is a block diagram of an electronic device in a network environment according to various embodiments.

Referring to FIG. 6, an electronic device 601 may communicate with an electronic device 602 through a first network 698 (e.g., a short-range wireless communication) or may communicate with an electronic device 604 or a server 608 through a second network 699 (e.g., a long-distance wireless communication) in a network environment 600. According to an embodiment, the electronic device 601 may communicate with the electronic device 604 through the server 608. According to an embodiment, the electronic device 601 may include a processor 620, a memory 630, an input device 650, a sound output device 655, a display device 660, an audio module 670, a sensor module 676, an interface 677, a haptic module 679, a camera module 680, a power management module 688, a battery 689, a communication module 690, a subscriber identification module 696, and an antenna module 697. According to some embodiments, at least one (e.g., the display device 660 or the camera module 680) among components of the electronic device 601 may be omitted or other components may be added to the electronic device 601. According to some embodiments, some components may be integrated and implemented as in the case of the sensor module 676 (e.g., a fingerprint sensor, an iris sensor, or an illuminance sensor) embedded in the display device 660 (e.g., a display).

The processor 620 may operate, for example, software (e.g., a program 640) to control at least one of other components (e.g., a hardware or software component) of the electronic device 601 connected to the processor 620 and may process and compute a variety of data. The processor 620 may load a command set or data, which is received from other components (e.g., the sensor module 676 or the communication module 690), into a volatile memory 632, may process the loaded command or data, and may store result data into a nonvolatile memory 634. According to an embodiment, the processor 620 may include a main processor 621 (e.g., a central processing unit or an application processor) and an auxiliary processor 623 (e.g., a graphic processing device, an image signal processor, a sensor hub processor, or a communication processor), which operates independently from the main processor 621, additionally or alternatively uses less power than the main processor 621, or is specified to a designated function. In this case, the auxiliary processor 623 may operate separately from the main processor 621 or embedded.

In this case, the auxiliary processor 623 may control, for example, at least some of functions or states associated with at least one component (e.g., the display device 660, the sensor module 676, or the communication module 690) among the components of the electronic device 601 instead of the main processor 621 while the main processor 621 is in an inactive (e.g., sleep) state or together with the main processor 621 while the main processor 621 is in an active (e.g., an application execution) state. According to an embodiment, the auxiliary processor 623 (e.g., the image signal processor or the communication processor) may be implemented as a part of another component (e.g., the camera module 680 or the communication module 690) that is functionally related to the auxiliary processor 623. The memory 630 may store a variety of data used by at least one component (e.g., the processor 620 or the sensor module 676) of the electronic device 601, for example, software (e.g., the program 640) and input data or output data with respect to commands associated with the software. The memory 630 may include the volatile memory 632 or the nonvolatile memory 634.

The program 640 may be stored in the memory 630 as software and may include, for example, an operating system 642, a middleware 644, or an application 646.

The input device 650 may be a device for receiving a command or data, which is used for a component (e.g., the processor 620) of the electronic device 601, from an outside (e.g., a user) of the electronic device 601 and may include, for example, a microphone, a mouse, or a keyboard.

The sound output device 655 may be a device for outputting a sound signal to the outside of the electronic device 601 and may include, for example, a speaker used for general purposes, such as multimedia play or recordings play, and a receiver used only for receiving calls. According to an embodiment, the receiver and the speaker may be either integrally or separately implemented.

The display device 660 may be a device for visually presenting information to the user and may include, for example, a display, a hologram device, or a projector and a control circuit for controlling a corresponding device. According to an embodiment, the display device 660 may include a touch circuitry or a pressure sensor for measuring an intensity of pressure on the touch.

The audio module 670 may convert a sound and an electrical signal in dual directions. According to an embodiment, the audio module 670 may obtain the sound through the input device 650 or may output the sound through an external electronic device (e.g., the electronic device 602 (e.g., a speaker or a headphone)) wired or wirelessly connected to the sound output device 655 or the electronic device 601.

The sensor module 676 may generate an electrical signal or a data value corresponding to an operating state (e.g., power or temperature) inside or an environmental state outside the electronic device 601. The sensor module 676 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 677 may support a designated protocol wired or wirelessly connected to the external electronic device (e.g., the electronic device 602). According to an embodiment, the interface 677 may include, for example, an HDMI (high-definition multimedia interface), a USB (universal serial bus) interface, an SD card interface, or an audio interface.

A connecting terminal 678 may include a connector that physically connects the electronic device 601 to the external electronic device (e.g., the electronic device 602), for example, an HDMI connector, a USB connector, an SD card connector, or an audio connector (e.g., a headphone connector).

The haptic module 679 may convert an electrical signal to a mechanical stimulation (e.g., vibration or movement) or an electrical stimulation perceived by the user through tactile or kinesthetic sensations. The haptic module 679 may include, for example, a motor, a piezoelectric element, or an electric stimulator.

The camera module 680 may shoot a still image or a video image. According to an embodiment, the camera module 680 may include, for example, at least one lens, an image sensor, an image signal processor, or a flash.

The power management module 688 may be a module for managing power supplied to the electronic device 601 and may serve as at least a part of a power management integrated circuit (PMIC).

The battery 689 may be a device for supplying power to at least one component of the electronic device 601 and may include, for example, a non-rechargeable (primary) battery, a rechargeable (secondary) battery, or a fuel cell.

The communication module 690 may establish a wired or wireless communication channel between the electronic device 601 and the external electronic device (e.g., the electronic device 602, the electronic device 604, or the server 608) and support communication execution through the established communication channel. The communication module 690 may include at least one communication processor operating independently from the processor 620 (e.g., the application processor) and supporting the wired communication or the wireless communication. According to an embodiment, the communication module 690 may include a wireless communication module 692 (e.g., a cellular communication module, a short-range wireless communication module, or a GNSS (global navigation satellite system) communication module) or a wired communication module 694 (e.g., an LAN (local area network) communication module or a power line communication module) and may communicate with the external electronic device using a corresponding communication module among them through the first network 698 (e.g., the short-range communication network such as a Bluetooth, a WiFi direct, or an IrDA (infrared data association)) or the second network 699 (e.g., the long-distance wireless communication network such as a cellular network, an internet, or a computer network (e.g., LAN or WAN)). The above-mentioned various communication modules 690 may be implemented into one chip or into separate chips, respectively.

According to an embodiment, the wireless communication module 692 may identify and authenticate the electronic device 601 using user information stored in the subscriber identification module 696 in the communication network.

The antenna module 697 may include one or more antennas to transmit or receive the signal or power to or from an external source. According to an embodiment, the communication module 690 (e.g., the wireless communication module 692) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 601 and the external electronic device 604 through the server 608 connected to the second network 699. Each of the electronic devices 602 and 604 may be the same or different types as or from the electronic device 601. According to an embodiment, all or some of the operations performed by the electronic device 601 may be performed by another electronic device or a plurality of external electronic devices. When the electronic device 601 performs some functions or services automatically or by request, the electronic device 601 may request the external electronic device to perform at least some of the functions related to the functions or services, in addition to or instead of performing the functions or services by itself. The external electronic device receiving the request may carry out the requested function or the additional function and transmit the result to the electronic device 601. The electronic device 601 may provide the requested functions or services based on the received result as is or after additionally processing the received result. To this end, for example, a cloud computing, distributed computing, or client-server computing technology may be used.

Figure 7:
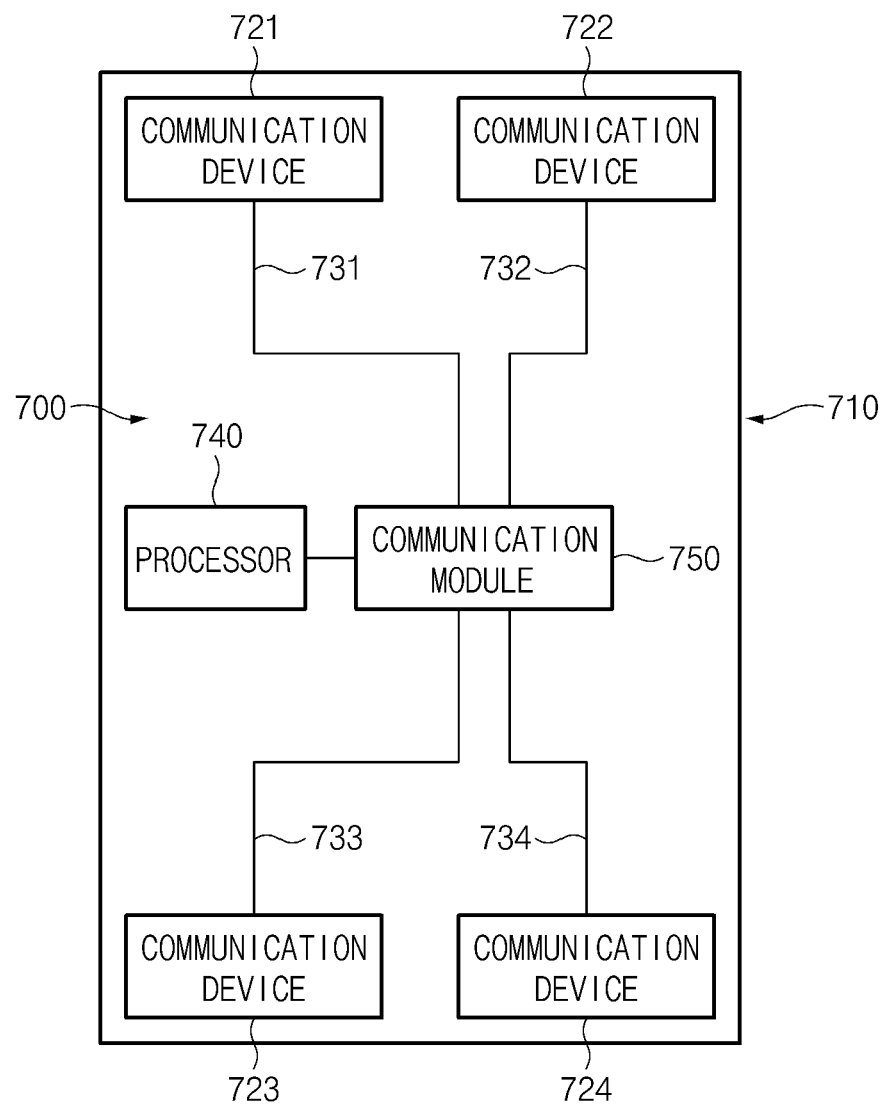
FIG. 7 is a view illustrating an example of an electronic device supporting 5G communication, according to an embodiment.

FIG. 7 is a view illustrating an example of an electronic device supporting 5G communication.

Referring to FIG. 7, the electronic device 700 may include a housing 710, a processor 740, a communication module 750 (e.g., the communication module 152 of FIG. 1 or the communication module 690 of FIG. 6), a first communication device 721, a second communication device 722, a third communication device 723, a fourth communication device 724, a first conductive line 731, a second conductive line 732, a third conductive line 733, or a fourth conductive line 734.

According to an embodiment, the housing 710 may protect any other components of the electronic device 700. The housing 710 may include, for example, a front plate, a back plate facing away from the front plate, and a side member (or a metal frame) surrounding a space between the front plate and the back plate. The side member may be attached to the back plate or may be integrally formed with the back plate.

According to an embodiment, the electronic device 700 may include at least one communication device. For example, the electronic device 1000 may include the first communication device 721, the second communication device 722, the third communication device 723, or the fourth communication device 724.

According to an embodiment, the first communication device 721, the second communication device 722, the third communication device 723, or the fourth communication device 724 may be positioned within the housing 710.

According to an embodiment, when viewed from above the front plate of the electronic device, the first communication device 721 may be positioned at a left top end of the electronic device 700, the second communication device 722 may be positioned at a right top end of the electronic device 700, the third communication device 723 may be positioned at a left bottom end of the electronic device 700, and the fourth communication device 700 may be positioned at a right bottom end of the electronic device 700.

According to an embodiment, the processor 740 may include one or more of a central processing unit, an application processor, a graphic processing unit (GPU), an image signal processor of a camera, or a baseband processor (or a communication processor (CP)). According to an embodiment, the processor 740 may be implemented with a system on chip (SoC) or a system in package (SiP).

According to an embodiment, the communication module 750 may be electrically connected with at least one communication device by using at least one conductive line. For example, the communication module 750 may be electrically connected with the first communication device 721, the second communication device 722, the third communication device 723, or the fourth communication device 724, using the first conductive line 731, the second conductive line 732, the third conductive line 733, or the fourth conductive line 734. For example, the communication module 750 may include a baseband processor, an RFIC, or an IFIC. The communication module 750 may include, for example, a baseband processor that is independent of the processor 740 (e.g., an application processor (AP)). The first conductive line 731, the second conductive line 732, the third conductive line 733, or the fourth conductive line 734 may include, for example, a coaxial cable or a FPCB.

According to an embodiment, the communication circuit 750 may include a first baseband processor (BP) (not illustrated) or a second baseband processor (not illustrated). The electronic device 700 may further include one or more interfaces for supporting inter-chip communication between the first BP (or the second BP) and the processor 740. The processor 740 and the first BP or the second BP may transmit/receive data, using the inter-chip interface (e.g., an inter processor communication channel).

According to an embodiment, the first BP or the second BP may provide an interface for performing communication with any other entities. The first BP may support, for example, wireless communication with regard to a first network (not illustrated). The second BP may support, for example, wireless communication with regard to a second network (not illustrated).

According to an embodiment, the first BP or the second BP may form one module with the processor 740. For example, the first BP or the second BP may be integrally formed with the processor 740. For another example, the first BP or the second BP may be disposed in one chip or may be implemented in the form of an independent chip. According to an embodiment, the processor 740 and at least one baseband processor (e.g., the first BP) may be integrally formed within one chip (e.g., SoC), and another baseband processor (e.g., the second BP) may be implemented in the form of an independent chip.

According to an embodiment, the first network (not illustrated) or the second network (not illustrated) may correspond to the network 699 of FIG. 6. According to an embodiment, the first network (not illustrated) and the second network (not illustrated) may include a 4th generation (4G) network and a 5th generation (5G) network, respectively. The 4G network may support, for example, a long term evolution (LTE) protocol defined in the 3GPP. The 5G network may support, for example, a new radio (NR) protocol defined in the 3 GPP.

Figure 8:
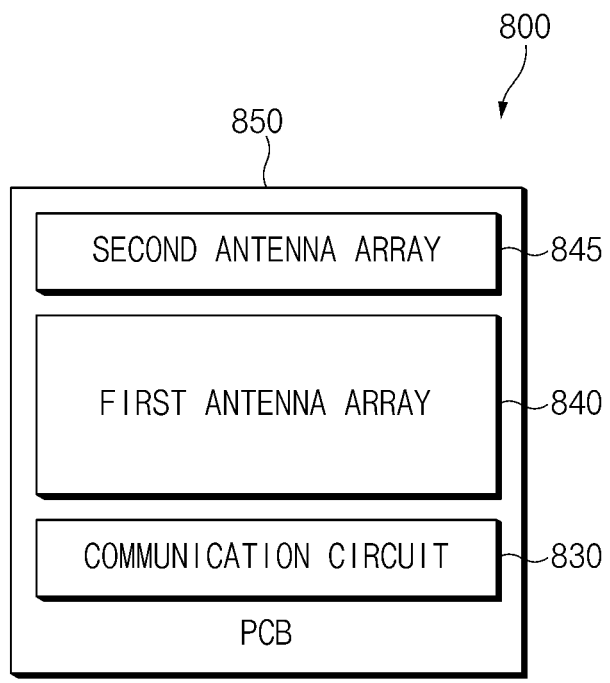
FIG. 8 is a block diagram of a communication device, according to an embodiment.

FIG. 8 is a block diagram of a communication device according to an embodiment.

Referring to FIG. 8, a communication device 800 (e.g., the communication devices 721, 722, 723, and 724 of FIG. 7) may include a communication circuit 830 (e.g., RFIC), a PCB 850, and at least one antenna array (e.g., a first antenna array 840 or a second antenna array 845).

According to an embodiment, the communication circuit 830 or at least one antenna array may be positioned on or in the PCB 850. For example, the first antenna array 840 or the second antenna array 845 may be disposed on a first surface of the PCB 850, and the communication circuit 830 may be disposed on a second surface of the PCB 850. The PCB 850 may include a connector (e.g., a coaxial cable connector or a board to board (B-to-B) connector) for electrical connection with any other PCB (e.g., a PCB on which the communication module 750 of FIG. 7 is disposed), using a transmission line (e.g., the first conductive line 731 of FIG. 7 or a coaxial cable). The PCB 850 may be connected with the PCB on which the communication module 750 is positioned, for example, by using a coaxial cable, and the coaxial cable may be used to transmit a transmit/receive IF or RF signal. For another example, a power or any other control signal may be delivered through the B-to-B connector.

According to an embodiment, the first antenna array 840 or the second antenna array 845 may include a plurality of antenna elements. The plurality of antenna elements may include a patch antenna or a dipole antenna. For example, an antenna element included in the first antenna array 840 may be a patch antenna for forming a beam toward the back plate of the electronic device 700. For another example, an antenna element included in the second antenna array 845 may be a dipole antenna for forming a beam toward a side member of the electronic device 700.

According to an embodiment, the communication circuit 830 may support at least part (e.g., 24 GHz to 30 GHz or 37 GHz to 40 GHz) of a band ranging from 24 GHz to 100 GHz. According to an embodiment, the communication circuit 830 may up-convert or down-convert a frequency. For example, the communication circuit 830 included in the communication device 800 (e.g., the first communication device 721 of FIG. 7) may up-convert an IF signal received from a communication module (e.g., the communication module 750 of FIG. 7) through a conductive line (e.g., the first conductive line 731 of FIG. 7) to an RF signal. For another example, the communication circuit 830 included in the communication device 800 (e.g., the first communication device 721 of FIG. 7) may down-convert an RF signal (e.g., a millimeter wave signal) received through the first antenna array 840 or the second antenna array 845 into an IF signal and may transmit the IF signal to a communication module by using a conductive line.

Figure 9:
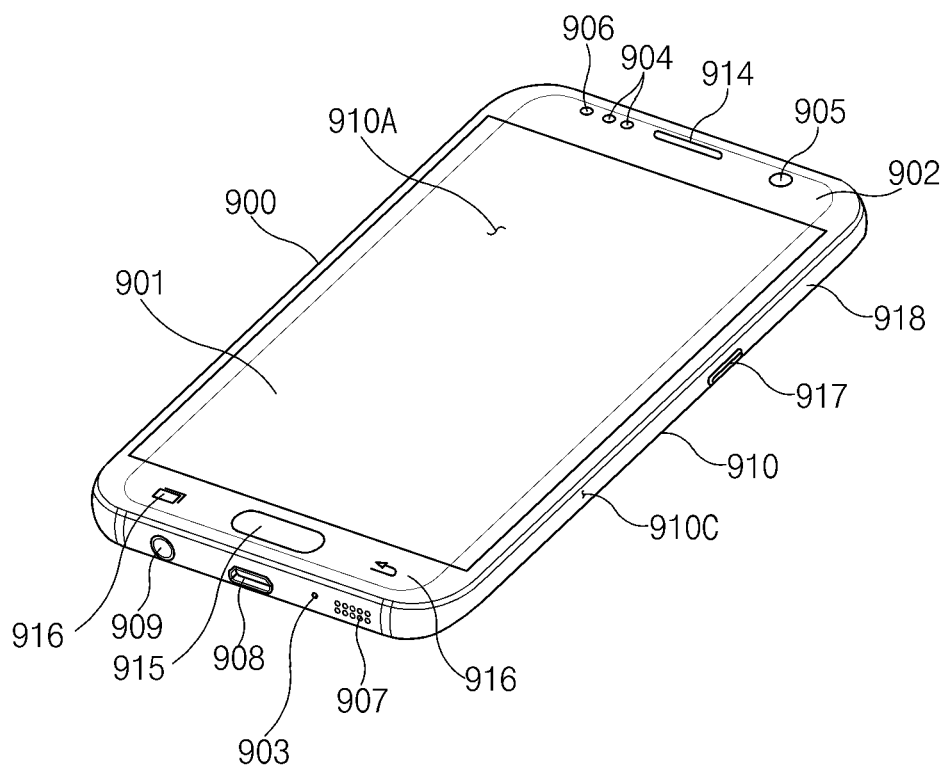
FIG. 9 is a front perspective view of an electronic device, according to an embodiment.
Figure 10:
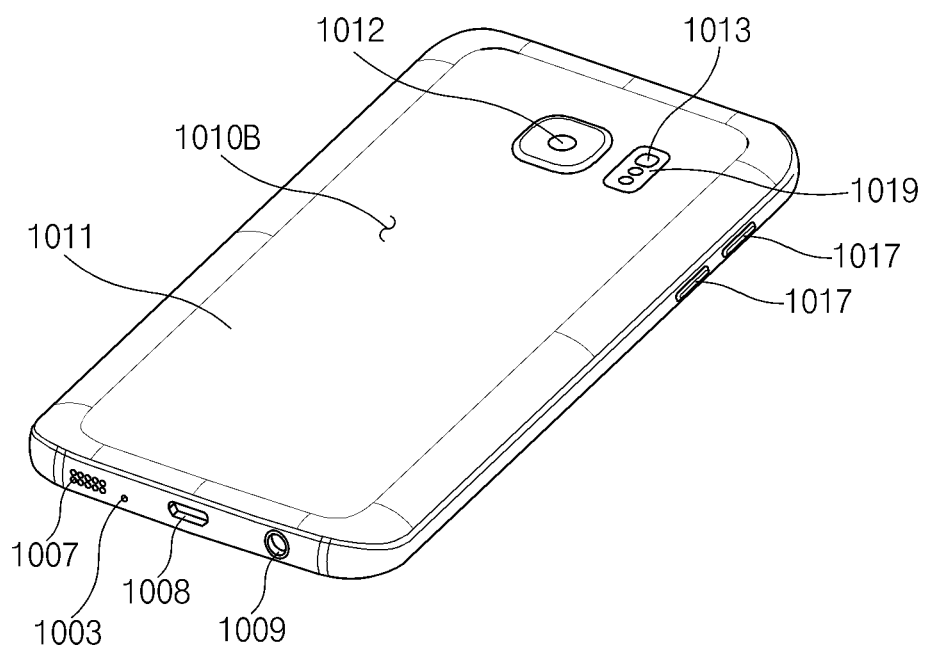
FIG. 10 is a rear perspective view of an electronic device of FIG. 9.
Figure 11:
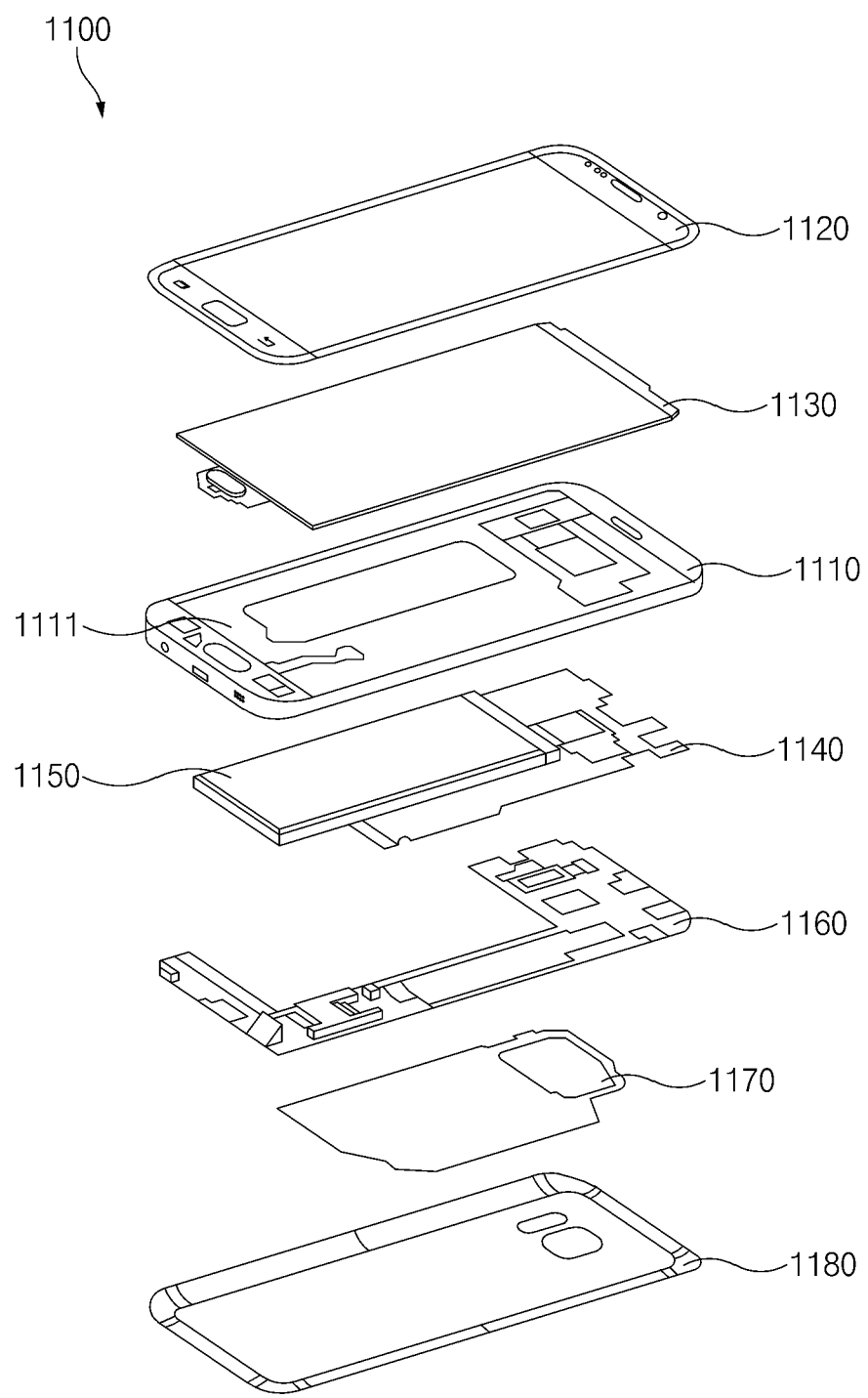
FIG. 11 is an exploded perspective view of an electronic device of FIG. 9.

FIG. 9 is a front perspective view of an electronic device according to an embodiment. FIG. 10 is a rear perspective view of an electronic device of FIG. 9. FIG. 11 is an exploded perspective view of an electronic device of FIG. 9.

Referring to FIGS. 9 and 10, an electronic device 900 according to an embodiment may include a housing 910 including a first surface (or a front surface) 910A, a second surface (or a rear surface) 910B, and a side surface 910C surrounding a space between the first surface 910A and the second surface 910B. In another embodiment (not illustrated), a housing may refer to a structure that forms a part of the first surface 910A, the second surface 910B, and the side surface 910C of FIG. 9. According to an embodiment, the first surface 910A may be implemented with a front plate 902 (e.g., a glass plate including various coating layers, or a polymer plate), at least a portion of which is substantially transparent. The second surface 910B may be implemented with a rear plate 911 that is substantially opaque. For example, the rear plate 911 may be implemented with a coated or colored glass, a ceramic, a polymer, a metal (e.g., aluminum, stainless steel (STS), or magnesium), or a combination of at least two of the materials. The side surface 910C may be coupled with the front plate 902 and the rear plate 911, and may be formed by a side bezel structure (or a "side member") 918 including metal and/or polymer. In an embodiment, the back plate 911 and the side bezel structure 918 may be integrally formed and may include the same material (e.g., a metal material such as aluminum).

According to an embodiment, the electronic device 900 may include at least one or more of a display 901, an audio module 903, 907, and 914, a sensor module 904 and 919, a camera module 905, 912, and 913, a key input device 915, 916, and 917, an indicator 906, and connector holes 908 and 909. In any embodiment, the electronic device 900 may not include at least one (e.g., the key input device (915, 916, 917) or the indicator 906) of the components or may further include any other component.

The display 901 may be exposed through a considerable portion of the front plate 902, for example. The display 901 may be coupled with a touch sensing circuit, a pressure sensor which may measure the intensity (or pressure) of a touch, and/or a digitizer detecting a magnetic stylus pen or may be positioned adjacent thereto.

The audio module (903, 907, 914) may include a microphone hole 903 and a speaker hole (907, 914). A microphone for obtaining external sound may be disposed within the microphone hole 903; in an embodiment, a plurality of microphones may be disposed to make it possible to detect a direction of sound. The speaker hole (907, 914) may include an external speaker hole 907 and a receiver hole 914 for call. In an embodiment, the speaker hole (907, 914) and the microphone hole 903 may be implemented with one hole, or a speaker (e.g., a piezoelectric speaker) may be included without the speaker hole (907, 914).

The sensor module (904, 919) may generate an electrical signal or a data value corresponding to an internal operation state of the electronic device 900 or corresponding to an external environment state. The sensor module (904, 919) may include, for example, a first sensor module 904 (e.g., a proximity sensor) and/or a second sensor module (not illustrated) (e.g., a fingerprint sensor) positioned on the first surface 910A of the housing 910, and/or a third sensor module 919 (e.g., a hear rate monitor (HRM) sensor) positioned on the second surface 910B of the housing 910. The fingerprint sensor may be positioned on the second surface 910B as well as the first surface 910A (e.g., a home key button 915) of the housing 910. The electronic device 900 may further include a sensor module not illustrated, for example, at least one of a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, or an illumination sensor 904.

The camera module (905, 912, 913) may include a first camera device 905 positioned on the first surface 910A of the electronic device 900, and a second camera module 912 and/or a flash 913 positioned on the second surface 910B. The camera module (905, 912) may include one or more lenses, an image sensor, and/or an image signal processor. The flash 913 may include, for example, a light emitting diode or a xenon lamp. In any embodiment, two or more lenses (wide-angle and telephoto lenses) and image sensors may be positioned on one surface of the electronic device 900.

The key input device (915, 916, 917) may include the home key button 915 positioned on the first surface 910A of the housing 910, a touch pad 916 positioned in the vicinity of the home key button 915, and/or a side key button 917 positioned on the side surface 910C of the housing 910. In another embodiment, the electronic device 900 may not include all or a part of the aforementioned key input device (915, 916, 917), and the key input device (915, 916, 917) not included may be implemented in the form of a soft key on the display 901.

The indicator 906 may be positioned, for example, on the first surface 910A of the housing 910. The indicator 906 may provide state information of the electronic device 900, for example, in the form of light, and may include an LED.

The connector hole (908, 909) may include a first connector hole 908 that is capable of accommodating a connector (e.g., a USB connector) for transmitting/receiving a power and/or data to/from an external electronic device, and/or a second connector hole (or an earphone jack) 909 that is capable of accommodating a connector for transmitting/receiving an audio signal to/from the external electronic device.

Referring to FIG. 11, an electronic device 1100 may include a side bezel structure 1110, a first support member 1111 (e.g., a bracket), a front plate 1120, a display 1130, a printed circuit board 1140, a battery 1150, a second support member 1160 (e.g., a rear case), an antenna 1170, and a rear plate 1180. In any embodiment, the electronic device 1100 may not include at least one (e.g., the first support member 1111 or the second support member 1160) of the components or may further include any other component. At least one of the components of the electronic device 1100 may be identical or similar to at least one of the components of the electronic device 900 of FIG. 9 or 10, and thus, additional description will be omitted to avoid redundancy.

The first support member 1111 may be disposed inside the electronic device 1100, and may be connected to the side bezel structure 1110 or may be integrally formed with the side bezel structure 1110. The first support member 1111 may be formed of, for example, a metal material and/or a nonmetal material (e.g., polymer). The display 1130 may be coupled with one surface of the first support member 1111, and the printed circuit board 1140 may be coupled with an opposite surface of the first support member 311. A processor, a memory, and/or an interface may be mounted on the printed circuit board 1140. For example, the processor may include one or more of a central processing unit, an application processor, a graphic processing device, an image signal processor, a sensor hub processor, or a communication processor.

The memory may include, for example, a volatile memory or a nonvolatile memory.

The interface may include, for example, a high definition multimedia interface (HDMI), a universal serial bus (USB) interface, a secure digital (SD) card interface, and/or an audio interface. The interface may electrically or physically connect, for example, the electronic device 1100 to an external electronic device and may include a USB connector, an SD card/MMC connector, or an audio connector.

The battery 1150 that is a device for supplying power to at least one component of the electronic device 1100 may include, for example, a primary cell incapable of being recharged, a secondary cell rechargeable, or a fuel cell. At least part of the battery 1150 may be disposed on substantially the same plane as the printed circuit board (PCB) 1140, for example. The battery 1150 may be integrally disposed within the electronic device 900, or may be disposed to be removable from the electronic device 900.

The antenna 1170 may be interposed between the back plate 1180 and the battery 1150. The antenna 1170 may include, for example, a near field communication (NFC) antenna, an antenna for wireless charging, and/or a magnetic secure transmission (MST) antenna. For example, the antenna 1170 may perform short range communication with an external device or may wirelessly transmit/receive a power necessary to charge. In another embodiment, an antenna structure may be formed by a part of the side bezel structure 1110 and/or the first support member 1111, or by a combination thereof.

An electronic device may reduce influence of the housing formed of a dielectric substance upon radiating a millimeter wave signal. For example, the electronic device may allow a radiation pattern of the millimeter wave signal to have directivity in a target direction and may reduce distortion of the radiation pattern due to the housing, thereby improving the communication performance of electronic device.

According to an embodiment, an electronic device may include a housing including a front surface, a rear surface facing away from the front surface, and a side member surrounding a space between the front surface and the rear surface, a rigid printed circuit board disposed inside the housing and including a first ground, a flexible printed circuit board including a second ground and extended toward the side surface from one end of the rigid printed circuit board, a plurality of antenna elements mounted on the flexible printed circuit board and radiating a millimeter wave signal, a support member fixing the flexible printed circuit board to be at a predetermined angle with the rear surface, and a communication circuit electrically connected to the plurality of antenna elements and communicating using the millimeter wave signal. The first ground and the second ground may allow a radiation pattern of the millimeter wave signal to have directivity in a direction of the side surface, by shielding a component, which is radiated toward at least part of the front surface or the rear surface, of a millimeter wave signal radiated from the plurality of radiators. The front surface may be formed of a dielectric substance having first permittivity and the rear surface is formed of a dielectric substance having second permittivity.

According to an embodiment, the plurality of antenna elements may be spaced at a specified interval and mounted on the flexible printed circuit board.

According to an embodiment, the support member may fix at least part of the flexible printed circuit board to be bent in a direction of the front surface from the direction of the side surface.

According to an embodiment, the support member may fix at least part of the flexible printed circuit to be bent in a direction of the rear surface from the direction of the side surface.

According to an embodiment, a second wave blocking region where the second ground shields a component, which is radiated toward at least part of the front surface or the rear surface, of a millimeter wave signal radiated from the plurality of antenna elements may be wider than a first wave blocking region where the first ground shields a component, which is radiated toward at least part of the front surface or the rear surface, of a millimeter wave signal radiated from the plurality of antenna elements.

According to an embodiment, the electronic device may further include a wave absorber disposed to be spaced from the printed circuit board by a specified distance. The wave absorber may absorb a portion of a component, which is radiated toward the front surface or the rear surface, of the millimeter wave signal radiated from the plurality of radiators.

According to an embodiment, the electronic device may further include a reflection member disposed to be spaced from the printed circuit board by a specified distance. The reflection member may reflect a portion of a component, which is radiated toward the front surface or the rear surface, of the millimeter wave signal radiated from the plurality of radiators.

According to an embodiment, the plurality of antenna elements may operate as a dipole antenna.

According to an embodiment, the plurality of antenna elements may operate as a monopole antenna.

According to an embodiment, the electronic device may further include a patch antenna array electrically connected to the communication circuit. The patch antenna array may be disposed on the printed circuit board to face the front surface or the rear surface and radiates the millimeter wave signal.

In an embodiment, the plurality of antenna elements may radiate a millimeter wave signal including a first frequency band. The patch antenna array may radiate a millimeter wave signal including a second frequency band.

In an embodiment, the first frequency band may be identical to the second frequency band.

According to an embodiment, the millimeter wave signal may have a frequency between 20 GHz and 100 GHz.

According to an embodiment, the first permittivity and the second permittivity have the same magnitude.

According to an embodiment, the support member may be implemented with at least one of a cushion, a rib, a bracket, and a part of the housing.

According to an embodiment, when viewed from the front surface, the housing may include the side member including a first edge, a second edge facing away from the first edge, a third edge connecting one end of the first edge and one end of the second edge, and a fourth edge connecting an opposite end of the first edge and an opposite end of the second edge.

In an embodiment, the plurality of antenna elements may include a first plurality of antenna elements disposed to be adjacent to the first edge, a second plurality of antenna elements disposed to be adjacent to the second edge, a third plurality of antenna elements disposed to be adjacent to the third edge, and a fourth plurality of antenna elements disposed to be adjacent to the fourth edge.

According to an embodiment, when viewed from the front surface, the housing may be in the form of a circle.

In an embodiment, the plurality of antenna elements may be disposed to be spaced from the center of the circle by a specified distance toward the side surface.

According to an embodiment, a cross section of the side member is in the form of at least one of a rectangle, a semicircle, and a triangle.

The electronic device according to various embodiments disclosed in the disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that various embodiments of the disclosure and terms used in the embodiments do not intend to limit technologies disclosed in the disclosure to the particular forms disclosed herein; rather, the disclosure should be construed to cover various modifications, equivalents, and/or alternatives of embodiments of the disclosure. With regard to description of drawings, similar components may be assigned with similar reference numerals. As used herein, singular forms may include plural forms as well unless the context clearly indicates otherwise. In the disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the disclosure may be implemented by software (e.g., the program 140) including an instruction stored in a machine-readable storage media (e.g., an internal memory 136 or an external memory 138) readable by a machine (e.g., a computer). The machine may be a device that calls the instruction from the machine-readable storage media and operates depending on the called instruction and may include the electronic device (e.g., the electronic device 101). When the instruction is executed by the processor (e.g., the processor 120), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the disclosure may be executed sequentially, in parallel, repeatedly, or in a heuristic method. Also, at least some operations may be executed in different sequences, omitted, or other operations may be added.

The invention claimed is:

1. An electronic device comprising:
   a housing including a front surface, a rear surface facing away from the front surface, and a side member surrounding a space between the front surface and the rear surface, wherein the front surface is formed of a dielectric substance having first permittivity and the rear surface is formed of a dielectric substance having second permittivity;
   a rigid printed circuit board disposed inside the housing and including a first ground;
   a flexible printed circuit board including a second ground and extended toward the side surface from one end of the rigid printed circuit board;
   a plurality of antenna elements mounted on the flexible printed circuit board and configured to radiate a millimeter wave signal;
   a support member fixing the flexible printed circuit board to be at a predetermined angle with the rear surface; and
   a communication circuit electrically connected to the plurality of antenna elements and configured to communicate using the millimeter wave signal,
   wherein the first ground and the second ground allow a radiation pattern of the millimeter wave signal to have directivity in a direction of the side surface, by shielding a component, which is radiated toward at least part of the front surface or the rear surface, of a millimeter wave signal radiated from the plurality of radiators.

2. The electronic device of claim 1, wherein the plurality of antenna elements is spaced at a specified interval and mounted on the flexible printed circuit board.

3. The electronic device of claim 1, wherein the support member fixes at least part of the flexible printed circuit board to be bent in a direction of the front surface from the direction of the side surface.

4. The electronic device of claim 1, wherein the support member fixes at least part of the flexible printed circuit to be bent in a direction of the rear surface from the direction of the side surface.

5. The electronic device of claim 1, wherein a second wave blocking region where the second ground shields a component, which is radiated toward at least part of the front surface or the rear surface, of a millimeter wave signal radiated from the plurality of antenna elements is wider than a first wave blocking region where the first ground shields a component, which is radiated toward at least part of the front surface or the rear surface, of a millimeter wave signal radiated from the plurality of antenna elements.

6. The electronic device of claim 1, further comprising:
   a wave absorber disposed to be spaced from the printed circuit board by a specified distance,
   wherein the wave absorber absorbs a portion of a component, which is radiated toward the front surface or the rear surface, of the millimeter wave signal radiated from the plurality of radiators.

7. The electronic device of claim 1, further comprising:
   a reflection member disposed to be spaced from the printed circuit board by a specified distance,
   wherein the reflection member reflects a portion of a component, which is radiated toward the front surface or the rear surface, of the millimeter wave signal radiated from the plurality of radiators.

8. The electronic device of claim 1, wherein the plurality of antenna elements operates as a dipole antenna.

9. The electronic device of claim 1, wherein the plurality of antenna elements operates as a monopole antenna.

10. The electronic device of claim 1, further comprising:
    a patch antenna array electrically connected to the communication circuit,
    wherein the patch antenna array is disposed on the printed circuit board to face the front surface or the rear surface and radiates the millimeter wave signal.

11. The electronic device of claim 10, wherein the plurality of antenna elements radiate a millimeter wave signal including a first frequency band, and
    wherein the patch antenna array radiates a millimeter wave signal including a second frequency band.

12. The electronic device of claim 11, wherein the first frequency band is identical to the second frequency band.

13. The electronic device of claim 1, wherein the millimeter wave signal has a frequency between 20 GHz and 100 GHz.

14. The electronic device of claim 1, wherein the first permittivity and the second permittivity have the same magnitude.

15. The electronic device of claim 1, wherein the support member is implemented with at least one of a cushion, a rib, a bracket, and a part of the housing.

* * * * *